United States Patent Office 2,919,173
Patented Dec. 29, 1959

2,919,173

DYED FIBROUS GLASS MATERIAL AND PROCESS OF DYEING

William T. Roff, Jr., Tryon, N.C., assignor to J. P. Stevens & Co., Inc., New York, N.Y., a corporation of Delaware No Drawing. Application May 20, 1958
Serial No. 736,454

11 Claims. (Cl. 8—8)

This invention relates to a novel process for dyeing fibrous glass fabrics to produce a product having light and wash fastness.

Presently, the textile industry is seeking different methods for dyeing fibrous glass fabrics in order to promote a better competitive position for the fabric. For this purpose, since the fabric is composed of a siliceous material, some workers have concentrated on the synthesis of a silicone dye which would couple directly to the glass fabric and have all the desirable attributes of light and wash fastness. Thus far, the experiments have been unsuccessful. In my investigations, I sought to find an intermediate coupling agent which would combine with the glass fabric and the other part of the molecule would couple to the dyestuff. I tried various materials for this purpose, and quite unexpectedly I discovered an intermediate compound which can be used for the purpose. This intermediate compound makes possible producing a dyed fabric having good light and wash fastness.

Accordingly, an object of this invention is to provide a dyeing method for fibrous glass fabric.

Another object is to provide a dyed fibrous glass fabric having good light and wash fastness.

Other objects and advantages will become apparent from the following description of my invention.

In the present invention, an aminoalkyltrialkoxy silane in which the alkyl group contains 2 to 5 carbon atoms and the alkoxy groups each contain about 1 to 3 carbon atoms is reacted with an aromatic carboxylic acid to form an amide, and then the amide is reacted with a fibrous glass fabric under conditions by which the alkoxy groups combine with the glass to form a siloxy bond between them.

The silane compound may be represented by the following structural formula:

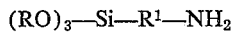

in which R is an alkyl group containing 1 to 3 carbon atoms and R¹ is another alkyl group containing 2 to 5 carbon atoms. A specific example is gamma-aminopropyltriethoxysilane.

The silane compound is reacted with an aromatic carboxylic acid to form an amide having the structural formula:

wherein R is an alkyl goup containing 1 to 3 carbon atoms, R¹ is an alkyl group containing 2 to 5 carbon atoms and R¹¹ is an aryl group which may be benzene, naphthalene, anthracene or phenanthrene as such or contain substituents such as amino, hydroxyl, nitro, nitroso, halogen, alkoxy, alkyl, alkoxyalkyl, alkenyl, etc. The aromatic carboxylic acid may contain one or more functional acid groups, for example, 2 or 3 acid groups. It is intended herein to designate "aromatic carboxylic acid" as being generic to the various acids disclosed. It is apparent from the amide that the aromatic carboxylic acid reactant may be mono-, di- or tricarboxylic acid, mono- or polynuclear, substituted or unsubstituted, and when substituted, it may have any of the substituents named above in connection with the description of the amide.

In the preparation of the amide, the silane and aromatic carboxylic acid are mixed together preferably at ambient level, and because the reaction is exothermic, the temperature may rise to about 250° F. The amidization reaction produces water as a by-product, which is preferably removed to avoid hydrolysis of the alkoxy groups which are attached to the silicon atom in the silane compound. The by-product water may be removed by treating the reaction mixture with a solid dehydrating agent, such as bauxite, lime, etc.

The reaction to form the amide is conducted in a nonaqueous medium, preferably organic in nature, and in which the reactants are soluble or may be dispersed. Suitable solvents are the aromatic hydrocarbons such as benzene or its lower homologues, e.g., toluene, xylene, cumene, etc., or, for example, those containing about 1 to 6 carbon atoms in substituent groups. The reaction may also be effected in any other inert organic solvent such as the halo-carbons, halogenated hydrocarbons, ethers, etc. The solvent should not boil at the temperature of reaction, nor should it be reactive with the reactants or the amide product.

The intermediate amide is combined with water to form a solution or dispersion of the amide for subsequent treatment of the fibrous glass fabric. The concentration of the amide-water system will vary depending upon the shade of color which is desired. For example, a pastel shade may require about 1 to 8 lbs. of amide per 50 gallons of water, and the concentration may go as high as 15 lbs. per 50 gallons, at which concentration a deep shade of color is obtained. The amide-water bath is arranged to receive the fibrous glass fabric for complete wetting. The bath temperature is preferably at ambient level, and preferably, it does not exceed about 100° F. because at higher temperatures there is a tendency for the alkoxy groups of the amide to hydrolyze. The wetting operation may take about 5 to 15 seconds, although less or more time can be used. In the next step of the operation the fabric is partially dried of amide solution by physical means such as wringing or pressing, so that the fabric may contain about 30 to 60% by weight of amide-water.

The fabric wetted with a desired amount of amide-water is dried by heating to a temperature which may range up to the decomposition temperature of the amide, although usually the temperature of drying varies from about 140° to 300° F. The drying operation may take from about 3 to 10 minutes, however, the length of time may vary outside such a range without departing from the scope of the present invention. While the wetted fabric is being dried, curing takes place. This involves a reaction between the amide and the glass which probably involves the hydrolysis of the alkoxy groups which are attached to the silicon atom of the amide and subsequent attachment or combination with the glass through a siloxy linkage.

The treated fabric is ready to be dyed. A fast color dye is employed, more particularly a diazonium salt having the formula:

wherein M is a negatively charged radical such as, for example, $ZnCl_4^=$, $CoCl_4^=$, $BF_4^-$, $HSO_4^-$, etc. and R is an aromatic group or nucleus, e.g. benzene, or a substituted benzene group including such substituents as nitro, halogen, alkyl, alkoxy, alkoxyalkyl, etc. groups, or R can be a polynuclear aromatic such as naphthalene, anthracene, as such, or substituted with the same substituents as were specified for the benzene group. Specific examples may be given by prototype numbers as specified in the 1957 Technical Manual of AATCC, vol. 33, namely, prototype numbers 255, 256, 258, 498, 259, 260, 499, 264, 272, 500, etc.

The diazonium salts are water soluble, and so for the dyeing operation they are dissolved in a water bath to provide, in general, a concentration of about 1 ounce to 32 ounces per 50 gallons of water. Such a range of concentration may cover all shades of color which may be desired, and, if not, variations outside the range are permissible within the scope of the invention. The cloth is dipped into the dye bath which may be held at ambient level and be as high as 100° F. It is not desirable to go beyond 60° F., because at higher levels the diazonium salts tend to become unstable. Coupling of the dye occurs instantly, and so it is preferred that the fabric be kept in the dye bath for a period as short as possible, because otherwise dye may agglomerate on the fabric unduly. Generally, the fabric is not kept more than about five minutes in the dye bath. In spite of all precautions, the fabric may contain excess dye, which is washed off by means of water. Preferably soap is used in the washing step. An alkali metal salt of a fatty acid, e.g. a fatty acid containing about 12 to 22 carbon atoms, e.g. sodium or potassium stearate. The residual metal content of the soap should be kept to a minimum in order to improve the bloom of the dyed fabric to a maximum extent.

The fibrous glass material is well known to those skilled in the art. It is a siliceous material, and presently a silicoborate type is being used widely for industrial applications and decorative purposes in homes and other places. In the manufacture of glass fibers, a binder such as starch and a lubricant such as hydrogenated vegetable oil are used to tie together the glass monofilaments. The binder and lubricant are termed for the purpose of this specification and the appended claims as carbonaceous materials. If the glass fiber contains these carbonaceous materials, it will not be possible to obtain complete reaction between the glass and the intermediate amide for the dyeing operation. The carbonaceous materials are looked upon as contaminants and should be removed prior to the reaction with the intermediate amide. These contaminants can be removed by heating processes known to those skilled in the art as the "batch process" and the "coronizing process." In the "batch process," the fibrous glass material is heated initially to 350° F. and thereafter the temperature is raised to 650° F. over a period of 65 hours. The "coronizing process" involves subjecting the fibrous glass material to a temperature of 1150° F.–1400° F. for 8 to 10 seconds. For my purpose, the "coronizing process" is preferred because it is far more economical than the "batch process."

To provide a fuller understanding of the present invention, reference will be had to the following specific examples.

*Example 1*

32 grams of gamma-aminopropyltriethoxysilane and 20 grams of para-aminobenzoic acid were reacted in 50 cc. of xylol. It was not necessary to apply external heat to initiate the reaction. The reaction is exothermic and the final temperature was about 225° F. The resultant amide product was not soluble in xylol and, therefore, the reaction medium comprised two layers, the upper layer being xylol and the lower layer being the amide product. The amide product was separated from the reaction medium and it was dispersed in one liter of water. The dispersion was maintained at ambient temperature. A piece of fibrous glass cloth was dipped into the amide-water dispersion and then padded, using a 25 lbs. roll pressure to give 30% pick-up of the amide- water dispersion. The padded cloth was dried in a laboratory oven at 300° F. for 5 minutes. A diazotization bath was prepared by using 10 cc. of 10% solution of sodium nitrite and 10 cc. of dilute (1:1) hydrochloric acid. The dried cloth was padded in the diazotization bath and then padded with an alcoholic solution of beta-naphthol, 10% by weight in denatured ethyl alcohol. As soon as the cloth was wetted by beta-naphthol, a deep red-orange color developed. After drying, it was found that the cloth was fast to washing and light.

*Example 2*

65 cc. of gamma-aminopropyltriethoxysilane and 40 grams of para-hydroxybenzoic acid were refluxed in 50 cc. of xylene for 5 hours. On standing, xylene separated from the reaction mixture and formed a supernatant layer. The resultant amide was separated from the reaction mixture and dispersed in 2 liters of water. A piece of fibrous glass cloth, Style 450, was dipped into the amide-water dispersion and then padded by using 25 lbs. roll pressure to provide a 30% pick-up of the amide-water dispersion. The padded cloth was dried in a laboratory oven at 300° F. for 5 minutes. The dried cloth was dipped into a bath containing 1 gram of 265 per liter of water Fast Orange Salt GR. The cloth contained a yellow-orange color. It was washed with warm water containing 1% by weight of a white pure medium-titer soap. The washed cloth developed full bloom as a result of washing with the soap.

*Example 3*

The procedure for Example 2 was used except that orthohydroxybenzoic acid was used in place of para-hydroxybenzoic acid. It was found that ortho-hydroxybenzoic acid or salicylic acid imparted a deeper color and better light fastness to the cloth than para-hydroxy benzoic acid.

Having described my invention by including specific examples, it should be understood that the scope of the invention is defined by the appended claims.

I claim:

1. A process which comprises treating a glass fiber with an amide of an aminoalkyltrialkoxysilane in which the alkyl group contains about 2 to 5 carbon atoms and the alkoxy groups each contain about 1 to 3 carbon atoms and of an aromatic carboxylic acid contained in a water medium, the fiber containing about 30 to 60% by weight of amide-water, drying the fiber under conditions such that the amide reacts with the fiber, and treating the resultant fiber with a diazonium salt to produce a color-fast fiber.

2. The process of claim 1 wherein the aromatic carboxylic acid is a hydroxybenzoic acid.

3. The process of claim 1 wherein the silane is gamma-aminopropyltriethoxysilane.

4. A process which comprises treating a glass fiber with an amide of an aminoalkyltrialkoxysilane in which the alkyl group contains about 2 to 5 carbon atoms and the alkoxy groups each contain about 1 to 3 carbon atoms and of an aromatic carboxylic acid contained in a water medium, the temperature of the water medium being maintained at about ambient level to 100° F., the fiber being treated to adjust the amide-water content to about 30 to 60% by weight, drying the fiber at a temperature of about 140° to 300° F., thereby the amide reacts with the fiber, and treating the resultant fiber with an aqueous solution of diazonium salt for a period not in excess of 5 minutes to produce a color-fast fiber.

5. The process of claim 4 being further characterized by washing the color-fast fiber with an aqueous solution of soap to improve bloom.

6. The process of claim 4 wherein the silane is gamma-aminopropyltrialkoxysilane.

7. The process of claim 4 wherein the aromatic carboxylic acid is a hydroxybenzoic acid.

8. A product prepared by the process defined in claim 1.

9. A product prepared in accordance with the process of claim 4.

10. The process of claim 1 wherein the aromatic carboxylic acid is para-aminobenzoic acid.

11. The process of claim 4 wherein the aromatic carboxylic acid is para-aminobenzoic acid.

References Cited in the file of this patent

UNITED STATES PATENTS

| | | |
|---|---|---|
| 2,715,133 | Speier | Aug. 9, 1955 |
| 2,832,754 | Jex | Apr. 29, 1958 |

OTHER REFERENCES

Organo Functional Silanes, Union Carbide and Carbon Corp., October 1956, pp. 1–17.